United States Patent Office 3,361,590
Patented Jan. 2, 1968

3,361,590
POLYGLYCIDYLPOLYAMINE TREATED POLYSACCHARIDES
Van R. Gaertner, Ballwin, Mo., assignor to Monsanto Company, St. Louis, Mo., a corporation of Delaware
No Drawing. Filed July 6, 1966, Ser. No. 563,088
5 Claims. (Cl. 117—135.5)

This application is a continuation-in-part of my application Ser. No. 212,438, filed July 25, 1962, now United States Patent 3,278,560 dated Oct. 11, 1966.

This invention relates to a series of polyamine compounds and to compositions thereof. More particularly, this invention provides new and useful derivatives of polyalkyleneamines.

It is an object of this invention to provide polysaccharide derivatives, including starch and cellulose derivatives of polyglycidylpolyamines.

Another object of this invention is to provide methods for sizing paper without need of curing at elevated temperatures.

Still another object of this invention is to provide methods for improving the wet and dry strength, and dimensional stability of cellulosic paper products.

Yet another object of this invention is to provide methods for rendering textile materials water-repellent in an improved manner.

Other aspects, objects, and advantages of this invention will be apparent from a consideration of the accompanying disclosure and the appended claims.

In accordance with this invention there is provided a polysaccharide selected from the group consisting of starch and a cellulose containing material treated with a compound of the formula

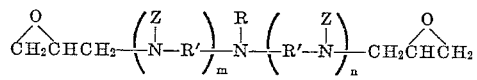

wherein R is selected from the group consisting of alkyl radicals having from 10 to 25 carbon atoms, alkenyl having from 10 to 25 carbon atoms, alkyl-substituted phenyl and biphenylyl radicals having from 10 to 25 carbon atoms in the alkyl substituents; R' is a bivalent alkylene radical having from 2 to 6 carbon atoms; $n$ plus $m$ equals a whole number of from 1 to 6, $n$ is a whole number of at least 1, $m$ is a whole number of from 0 to 5; Z is selected from the group consisting of hydrogen and the radical

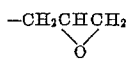

and at least 50% of the Z radicals are the radical

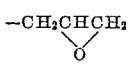

The parent application provides, among other aspects, as new compounds, polyglycidylpolyamines of the formula

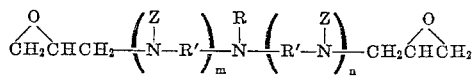

wherein R is selected from a group consisting of alkyl radicals having from 10 to 25 carbon atoms, alkenyl radicals having from 10 to 25 carbon atoms, alkyl-substituted phenyl, and biphenylyl radicals having from 10 to 25 carbon atoms in the alkyl substituents R' is a bivalent alkylene radical having from 2 to 6 carbon atoms, $n$ plus $m$ equals a whole number of from 1 to 6, $n$ is a whole number of at least 1, $m$ is a whole number of from 0 to 5, and Z is selected from the group consisting of hydrogen, and the radical

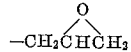

and at least a substantial number of the Z radicals are the radical

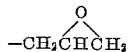

The compounds described above may be prepared and recovered as such, or as the mineral acid salts of said compounds, which are included in the embodiments of this invention.

Compounds described by the above general formula are prepared first by the reaction of an epihalohydrin such as epibromohydrin, epichlorohydrin, or epiiodohydrin with an amine of the formula

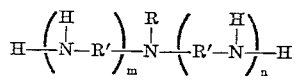

wherein R, R', $m$ and $n$ are as defined above. Following this, the reaction product can be contacted and reacted with an aqueous basic material to dehydrohalogenate the resulting intermediate to obtain as a reaction product, a compound with the general formula above. By dehydrohalogenation is meant the reaction of the basic material with the intermediate in such a way as to remove hydrogen halide therefrom, causing the formation of the glycidyl oxirane linkage, and a by-product which is the salt of the base and hydrogen halide given off in the reaction. See United States Patent 3,278,560 for additional details regarding these compounds.

In preparing polyglycidylpolyamines of this invention, the respective poly(halopropanol) amines are contacted and reacted with an aqueous basic material preferably in the presence of a dialkyl sulfoxide. As a result of the reaction with the basic material the halogen of the halopropanol groups is removed as the neutral salt in a by-product, and the oxygen atom from the hydroxy group becomes bonded to each of two carbon atoms of the resulting propyl group forming a terminal epoxide group. For example, by treating N-n-dodecyl-N,N',N'',N''',N'''-penta(3-bromo - 2 - hydroxypropyl)tributylenetetramine with aqueous potassium hydroxide there is obtained N-n-dodecyl - N,N',N'',N''',N'''' - penta(2,3-epoxypropyl)tributylenetetramine.

Additional examples of such polyglycidylpolyamine products obtained by treating with aqueous basic material as defined above the corresponding poly(3-halo-2-hydroxypropyl)polyamines are:

N''-tetracosyl-N,N,N',N''',N''''-penta(2,3-epoxypropyl) triethylenetetramine,

N''-nonadecyl-N,N,N',N''',N'''',N''''-hexa(2,3-epoxypropyl)-tetraethylenepentamine, N-undecenyl-N,N',N'-tris(2,3-epoxypropyl)pentylenediamine, N'-hexadecenyl-N,N,N'',N'''-tetra(2,3-epoxypropyl)dipropylenetriamine, N''-docosenyl-N,N,N',N''',N''''-penta(2,3-epoxypropyl) triethylenetetramine, N-(4-tert-dodecylphenyl)-N,N',N'-tris(2,3-epoxypropyl)-propylenediamine, N'''-(3,5-dinonylphenyl)-N,N,N',N'''',N''''-penta(2,3-epoxypropyl)tripropylenetetramine, and N-(3-methyl-4-dodecyl-N,N',N''',N'''',N''''',N''''''-hexa (2,3-epoxypropyl)pentaethylenehexamine.

Mixtures of alkyl- and alkenyl-substituted amines, i.e., where R is alkyl and alkenyl are likewise useful for preparing compounds of this invention. The alkyl-substituted amines are often derived from the respective alkenylamines by reduction of the unsaturated bond of the alkenyl group. Mixtures of alkyl- and alkenylamines having carbon chains of varying length may also be used. Examples of products obtained from such mixtures are: A mixture of N-octadecyl- and N-octadecenyl-N,N',N'-tris(3-chloro - 2 - hydroxypropyl)ethylenediamines obtained from the use of a mixture of N-octadecyl- and N-octadecenylethylenediamines; a mixture of N-hexadecyl-, N-hexadecenyl, N-octadecyl-, and N-octadecenyl-N,N',N'',N''',N''''-penta(3-chloro - 2 - hydroxypropyl)tripropylenetetramines obtained from the use of a mixture of N-hexadecyl-, N-hexadecenyl-, N-octadecyl-, and N-octadecenyltripropylenetetramines; and a mixture of N'' - (alkyl$_{(C20-C22)}$)-N,N,N',N''',N''''-penta(3-chloro-2-hydroxypropyl)triethylenetetramine obtained by the use of a mixture of N-(alkyl$_{(C20-C22)}$)triethylenetetramines.

Examples of salts of poly(halopropanol)polyamines described above are:

N,N,N',N'-tetra(3-chloro-2-hydroxypropyl)propylenediamine disulfate,
N-octadecyl-N,N',N'-tris(3-chloro-2-hydroxypropyl)ethylenediamine dihydrochloride;
N'-docosyl-N,N,N'',N'''-tetra(3-bromo-2-hydroxypropyl) dibutylenetriamine trihydrobromide,
N''-hexadecenyl-N,N,N',N''',N''''-penta(3-chloro-2-hydroxypropyl)triethylenetetramine tetraphosphate, and
N-(tert-dodecylphenyl-N,N',N''',N''''-tetra(3-chloro-2-hydroxypropyl)tripropylenetetramine tetrahydrochloride.

The products can contain isomers, where the higher polyalkylenepolyamines are used as the starting materials and when less than 100 percent of the amine hydrogens are replaced by the halopropanol groups in the intermediate products and the respective glycidyl groups in products of this invention. It is not essential to separate the isomeric products or to determine the exact position of the substituent group since such isomers are useful for the same purposes. For example, when tetraethylenepentamine is reacted with sufficient epichlorohydrin to replace all but 1 hydrogen with chloropropanol groups, the product obtained can be a mixture of isomers including N,N,N',N''',N'''',N'''' - hexa(3-chloro-2-hydroxypropyl)tetraethylenepentamine, N,N,N',N'',N'''',N''''-hexa(3-chloro-2 - hydroxypropyl)tetraethylenepentamine, and N,N,N'',N''',N'''',N'''' - hexa(3-chloro-2-hydroxypropyl)tetraethylenepentamine.

A particular embodiment of this invention is to provide polyglycidylpolyamine compounds having a hydrophobic group bonded to a nitrogen atom. These compounds are provided in accordance with this invention by having R denote an alkyl or alkenyl radical of at least ten carbon atoms, or an alkyl-substituted aryl group having at least 10 carbon atoms in the alkyl-substituents on the aryl nucleus. When R is an alkyl-substituted aryl radical it is preferred that the aryl nucleus contain one or two aromatic rings such as phenyl, naphthyl, biphenylyl, etc. with the monocyclic 6-membered aromatic ring being preferred, e.g., phenyl. These compounds having the hydrophobic groups are particularly valuable in uses as polysaccharide modifying agents such as water-proofing agents, sizing agents, etc. for starch- and cellulose-based products. A particular advantage of these compounds is that they provide good paper product sizing properties which cure at room temperature, that is, the treated polysaccharide material does not have to be heat cured to effect the sizing action of the compounds, although the use of a mild heating step may be preferred. These compounds are also useful for sizing and water-proofing starch and raw natural and modified cellulosic material such as cotton, and various textile materials including cellulose containing filaments, fibers, yarns, and fabrics. These materials are particularly valuable because they provide good permanent sizing and water-proofing properties that are not removed from the starch or cellulosic substrate by washing. This enhanced sizing and water-proofing effect is believed to be due to the fact that the polyglycidylamines react with the hydroxy groups of the starch or cellulosic substrate, for example, when applied as the paper product is being made, and effectively cross-link the cellulosic fibers to provide the desired enhanced property.

The compounds may be applied to the paper products according to techniques known to those skilled in the art. For example, the compounds may be applied to finished paper stock directly, in solution, as an emulsion, or in otherwise dispersed form. However, for best results it is preferred to apply, admix, or react the presently claimed compounds with the cellulosic paper stock in the pulp preparation stage in media providing a pH of at least 7, preferably a pH of from 9 to 11, before the pulp is formed into paper sheets, boards, etc. In this manner the sizing of the paper stocks with these compounds is most efficient and effective at low concentration. Concentrations of the sizing agent ranging from 0.01% to 5.0% by weight, based on the weight of the finished paper product, are generally sufficient to provide a permanently sized paper product. Concentrations on the order of 0.1% to 1% by weight of the sizing agent, that is, the polyglycidylamine based on the weight of the dry paper pulp are preferred.

A variety of pulps may be treated with the compounds described above and used to make permanently sized paper according to this invention including bleached and unbleached sulfite pulp, bleached and unbleached kraft pulp, soda pulp, hardwood pulp, and mixtures of ground wood pulp with unbleached kraft pulp and other pulps.

The water-proofing of textile materials is accomplished according to this invention by impregnating the cellulosic textile material comprising cellulose filaments, fibers, fabrics with a solution of the polyglycidylpolyamine compounds in an appropriate solvent and then volatilizing off the solvent, for example, by drying and curing, and thereafter subjecting the treated material to elevated temperatures to produce a substantially water insoluble finish in the cellulosic textile. The textile material may be impregnated with from 0.01% to 5% by weight of the polyglycidylpolyamine. The total amount of such polyamine compounds impregnated into the textile material is usually at least 0.075% by weight.

The compositions may be applied to the textile materials in various ways so long as impregnation of the textile materials is obtained. For example, the textile materials may be dipped or immersed in the composition or the composition may be dripped or sprayed on the textile material until the textile material is wetted out with the composition. In order to facilitate the control of deposition of the polyglycidylpolyamine compounds of this invention on the textile material and reduce the drying time, it is desirable to extract the textile material to remove excess solution therefrom. This is suitably accomplished by padding, wringing, squeezing, or hydroextracting the textile material. In general, the amount of such ingredients applied is between about 0.01 and 5% by weight, based on the dry textile material, but good practical water-repellent effects are obtained on most textiles by applying from about 0.1 to 2% by weight based on the dry textile material.

After the compounds have been applied, in solution, the textile material may then be dried at normal drying temperatures and finally heated at elevated temperatures of about 250 to 360° F. to obtain a water-repellent finish on the textile material. The temperature may be higher than 360° F. depending on the particular textile material, the type and amount of catalyst and the duration of heating is limited only by the stability of the textile material. The duration of heating may vary widely depending primarily on the liquid content and the temperature used but is generally between about 1 and 15 minutes with the longer times corresponding to the lower temperatures.

The textile material thus obtained may be given the usual finishing operation such as a refinish wash to remove water-soluble materials, steam framing and the like. Such operations may be desirable, but are not essential.

A large variety of textile materials comprising cellulose fibers may be treated in accordance with the processes of this invention, but the textile material should contain at least 40% by weight of cellulose fibers and probably 60% by weight or more of cellulose fibers. The textile materials treated may be woven or knitted fabrics, referred to generally as fabrics or yarns, filaments or fibers, but it is preferred to treat fabrics. The cellulose fibers may be natural cellulose fibers such as cotton, linen, flax or ramie fibers or regenerated cellulose staple fibers or filaments produced by the viscose or cuprammonium processes. It is preferred, however, to treat cotton fibers or viscose rayon staple fibers or filaments. The preferred textile materials are 100% cotton woven fabrics or 100% viscose rayon woven fabrics or woven fabrics composed entirely of cotton and viscose rayon.

The compounds described above are incorporated into cellulosic substrates in various manners, usually in the form of organic solutions or aqueous emulsions which are prepared according to techniques known in the art. The aqueous emulsions containing one or more of the above described compounds is usually accomplished with one or more of various types of cationic, anionic, or non-ionic emulsifying agents which are known in the art. The solutions and aqueous emulsions of the above compounds may also contain other paper making or textile auxiliaries such as stiffening or bodying agents, softening agents, curing agents, wetting agents, antifoaming agents, and the like, but such agents are not essential.

As examples of stiffening or bodying agents which may be employed may be mentioned aqueous dispersions of water-insoluble thermoplastic vinyl resins such as polyvinyl acetate, polyvinyl chloride, polystyrene, polyalkyl acrylates, polyalkyl methacrylates, vinyl chloride, vinyl acetate copolymers and the like and/or water-soluble thermoplastic resins such as polyvinyl alcohol; water-soluble partially hydrolyzed polyvinyl acetates; water-soluble salts of styrene-maleic anhydride copolymers, styrene-alkyl acid maleate copolymers, vinyl acetate-maleic anhydride copolymers, vinyl acetate-crotonic acid copolymers, vinyl acetate-alkyl acid maleate copolymers; or the like. Generally such agents are employed in amounts of about 0.05 to 5% by weight of the composition.

As examples of softening agents may be mentioned water-soluble alkali metal salts of sulfonated mineral oils, water-insoluble silicone compounds, water-insoluble oils, water-insoluble alcohols and the like. The amounts of such agent used varies with its effectiveness in minimizing foaming, but, in general, amounts of about 0.1 to 5% by weight of the composition may be employed.

The invention is further illustrated by but not limited to, the following examples wherein all parts are by weight and all temperatures are degrees centigrade unless otherwise stated.

*Example 1*

This example illustrates the utility of the compounds of this invention as cellulose modifying agents. N-(n-octadecyl) - N,N',N'-tris(2,3-epoxypropyl)-1,3 - propylenediamine was tested as a paper-sizing agent according to various sizing methods.

The tests used were as follows:

*Solvent dip.*—Dissolve 0.5 g. of the test compound in 100 ml. of xylene, dip strips of whatman No. 1 filter paper into this solution. The concentration and pickup of the solution is such that the treated paper has 0.35% by weight of the test compound thereon, after drying.

*Wet end method.*—In 5 ml. of xylene there is dissolved 0.75 g. of the test compound. The resulting solution is emulsified with 20 ml. of 0.1% hexadecyltrimethylammonium bromide, and this mixture is added to bleached refined Gatineau sulfite pulp. The thus treated pulp is made basic with alkali to pH 9 and hand sheets of paper are made from the treated pulp on the Noble-Wood machine. The dried paper directly from the machine is termed "off machine" paper. Cured samples of the treated paper are prepared by heating "off machine" paper in an oven for 60 minutes at 105° C.

The treated papers, prepared by any one of the above described methods are then tested according to the standard ink penetration test in which the time, in seconds, required for ink to penetrate through the paper floating on the surface of the ink bath is noted.

Samples of the treated papers are washed in chloroform for at least one hour, dried, and then tested in a similar manner in the ink penetration test.

Some of the treated paper strips which are allowed to age or cure at room temperature for 29 to 38 days were also tested.

The results were as follows (with 0.35% N-(n-octadecyl)-N, N', N'-tris(2,3-epoxypropyl) - 1,3 - propylenediamine):

| Method of Application | Cure Time Temp. (min.)(° C.) | Sizing Unwashed | CHCl₃ Washed |
|---|---|---|---|
| Solvent Dip | Off machine | 3,200 | >1,500 |
| Above paper stood 38 days at room temperature | do | 1,800 | 1,700 |
| Wet End—Paper stood 29 days at room temperature | do | >500 | 7,800 |

Control samples of paper treated with solutions having all of the ingredients except the test compound in each of the above tests were all instantaneously penetrated in the ink penetration test.

*Example 2*

Sample of N-(tallow alkyl-mainly n-C₁₈)-N,N',N'-tris (2,3-epoxypropyl) - 1,3-propylenetriamine·hydrochloride salt sizing composition as a dispersion was added to pulp containing 100 ml. of pH 9 buffer plus enough sodium hydroxide to neutralize all of the hydrochloride present and leave a pulp of pH 9.1 after hydrochloride neutralization. "Off machine" samples of paper formed from such pulp were tested for ink penetration and gave 4800 seconds, after washing with chloroform. Cured samples (105° C./60 minutes) gave 12,000 seconds, after washing, and cured samples catalyzed with triethylenediamine gave 18,300 sec. after washing with chloroform.

Control samples of paper treated with solutions having

As examples of wetting agents which may be used may be mentioned sodium salts of alkylated benzene-sulfonates such as sodium-decylbenzenesulfonate, sodium dodecylbenzenesulfonate; sodium lauryl sulfate; the sodium salt of methyl stearamide ethionic acid; dioctyl sodium sulfosuccinate; and the like. In general, such agents are employed in amounts of about 0.05 to 3% by weight of the composition.

As examples of anti-foaming agents may be mentioned sulfonated fatty alcohols such as sulfonated cetyl and stearyl alcohol, sulfonated castor oil and the like; water-soluble or water-dispersible polyethylene oxides of high molecular weight; the water-soluble reaction products of ethylene oxide or propylene oxide with aryl and aralkyl alcohols or with esters of a fatty acid and sorbitan and the like; cationic type softeners such as cetyl dimethyl benzyl ammonium chloride, or the like. Generally such agents are employed in amounts of 0.05 to 5% by weight of the composition.

all of the ingredients except the test compounds in each of the above tests were all instantaneously penetrated in the ink penetration test.

*Example 3*

This example illustrates the effectiveness of N-n-octadecyl-N,N',N' - tris(2,3-epoxypropyl) - 1,3-propylenediamine as a water-proofing agent.

Desized Indianhead cotton muslin swatches, 7" x 7" are used in the test. One percent solutions of the compound in hexane and acetone are prepared. The cotton swatches are weighed dry and then reweighed wet (after immersion in the test solution for 3 minutes) to measure the uptake of test chemical. The wet cotton samples are air-dried, and then dried for 10 and 20 minute periods in a circulating heat oven at 150 degrees centigrade. The samples are then conditioned for 4 hours at 65±2% relative humidity and 70 degrees ±2 degrees Fahrenheit. After conditioning, the treated swatches are fastened to a metal hoop and 250 ml. of water at 80 degrees ±2 degrees Fahrenheit are poured into a funnel and allowed to spray through a nozzle onto the cloth sample. The samples are then rated according to Standard Spray Test Rating of the Resistance to Wetting (spray test), AATCC Standard Test Method 22-1952, the 1959 Technical Manual of the American Association of Textile Chemists and Colorists. Sample swatches are washed for 3 minutes in the respective solvent and then dried and rechecked to see if the water-repellent finishes are permanent. N-n-octadecyl-N,N',N' - tris(2,3-epoxypropyl)-1,3-propylenediamine is satisfactory as a water-proofing agent.

While this invention has been described with respect to various specific examples and embodiments, it is to be understood that the invention is not limited thereto and that it can be variously practiced within the scope of the following claims.

I claim:

1. A polysaccharide selected from the group consisting of starch and a cellulose-containing material treated with a compound of the formula

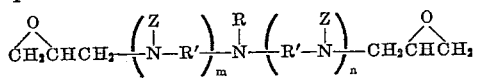

wherein R is selected from the group consisting of alkyl radicals having from 10 to 25 carbon atoms, alkenyl having from 10 to 25 carbon atoms, alkyl-substituted phenyl and biphenylyl radicals having from 10 to 25 carbon atoms in the alkyl substituents; R' is a bivalent alkylene radical having from 2 to 6 carbon atoms; n plus m equals a whole number of from 1 to 6, n is a whole number of at least 1, m is a whole number of from 0 to 5; Z is selected from the group consisting of hydrogen and the radical

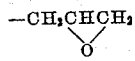

and at least 50% of the Z radicals are the radical

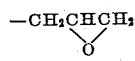

2. The composition according to claim 1 wherein the polysaccharide is a cellulosic paper.

3. A cellulosic paper according to claim 2 wherein the polyglycidylpolyamine is N-n-octadecyl-N,N',N'-tris(2,3-epoxypropyl)-1,3-propylenediamine.

4. A water-repellent cellulosic textile impregnated with a compound of the formula

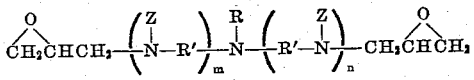

wherein R is selected from the group consisting of alkyl radicals having from 10 to 25 carbon atoms, alkenyl having from 10 to 25 carbon atoms, alkyl-substituted phenyl and biphenyl radicals having from 10 to 25 carbon atoms in the alkyl substituents; R' is a bivalent alkylene radical having from 2 to 6 carbon atoms; n plus m equals a whole number of from 1 to 6, n is a whole number of at least 1, m is a whole number of from 0 to 5; Z is selected from the group consisting of hydrogen and the radical

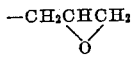

and at least 50% of the Z radicals are the radical

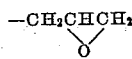

5. A water-repellent cellulosic textile according to claim 4 wherein the polyglycidylpolyamine is N-n-octadecyl-N,N',N'-tris(2,3 - epoxypropyl) - 1,3-propylenediamine.

References Cited

UNITED STATES PATENTS 3,578,560  10/1966  Gaertner _____ 8—115.6 X

NORMAN G. TORCHIN, *Primary Examiner.*

J. C. CANNON, *Assistant Examiner.*